United States Patent
Steijer et al.

(10) Patent No.: US 6,511,233 B1
(45) Date of Patent: Jan. 28, 2003

(54) SPRING CLIP

(75) Inventors: Odd Steijer, Bromma (SE); Paul Eriksen, Tyresö (SE)

(73) Assignee: Telefonaktiebolaget LM Ericsson, Stockholm (CH)

( * ) Notice: Subject to any disclaimer, the term of this patent is extended or adjusted under 35 U.S.C. 154(b) by 0 days.

(21) Appl. No.: 09/506,439

(22) Filed: Feb. 18, 2000

(30) Foreign Application Priority Data

Feb. 19, 1999 (SE) .................................. 9900578

(51) Int. Cl.[7] .............................. G02B 6/42; G02B 6/36
(52) U.S. Cl. .............................. 385/88; 385/55; 385/75
(58) Field of Search ............................. 385/88, 89, 92, 385/53, 55, 56, 58–60, 70–72, 75–78

(56) References Cited

U.S. PATENT DOCUMENTS

| | | | | |
|---|---|---|---|---|
| 4,461,537 A | * | 7/1984 | Raymer et al. | |
| 4,547,039 A | * | 10/1985 | Caron et al. | |
| 4,588,257 A | * | 5/1986 | Maranto | |
| 4,666,241 A | * | 5/1987 | Caron | |
| 4,759,600 A | * | 7/1988 | Caron et al. | |
| 4,896,938 A | | 1/1990 | Mathis et al. | |
| 5,047,835 A | * | 9/1991 | Chang | |
| 5,214,730 A | | 5/1993 | Nagasawa et al. | |
| 5,647,042 A | * | 7/1997 | Ochiai et al. | 385/56 |
| 5,721,798 A | | 2/1998 | Kanda et al. | |
| 5,960,136 A | * | 9/1999 | Shakhman et al. | 385/53 |
| 5,985,185 A | * | 11/1999 | Steijer et al. | 264/1.7 |
| 6,048,106 A | * | 4/2000 | Iwase | 385/88 |

* cited by examiner

*Primary Examiner*—Rodney Bovernick
*Assistant Examiner*—Michael J. Stahl
(74) *Attorney, Agent, or Firm*—Burns, Doane, Swecker & Mathis, L.L.P.

(57) ABSTRACT

The present invention relates to a spring clip for holding the connection sides of optical units in contact with one another, said optical units including guide pins and optical coupling surfaces. The clip includes a main part from which hooked members project out generally at right angles. A first and a second hooked member are adapted to snap firmly over a first optical unit, whereas a third hooked member is adapted to urge an optical connection side on a second optical unit against an optical connection side on the first optical unit.

8 Claims, 2 Drawing Sheets

SPRING CLIP

This application claims priority under 35 U.S.C. §§119 and/or 365 to 9900578-7 filed in Sweden on Feb. 19, 1999; the entire content of which is hereby incorporated by reference.

FIELD OF INVENTION

The present invention relates to a spring clip of the kind defined in the preamble of Claim 1.

DESCRIPTION OF THE BACKGROUND ART

A spring clip for optical contact devices is described and illustrated in U.S. Pat. No. 5,214,730. The spring clip includes hooked members which hook around the contact devices and urge said devices towards one another.

A spring clip of this kind cannot be easily held in place when wishing to separate the optical contact devices one from the other or to mutually connect said devices. This drawback presents a problem.

SUMMARY OF THE INVENTION

The object of the present invention is to at least reduce the aforesaid problem.

The aforesaid problem is addressed in accordance with the invention with a spring clip according to Claim 1.

One advantage with the present invention is that construction of the clip and its manufacture are both simple and inexpensive.

Another advantage afforded by the invention is that the clip is small and takes up very little space on a circuit board.

The invention will now be described in more detail with reference to preferred embodiments thereof and also with reference to the accompanying drawings.

PREFERRED EMBODIMENTS

Figure 1:
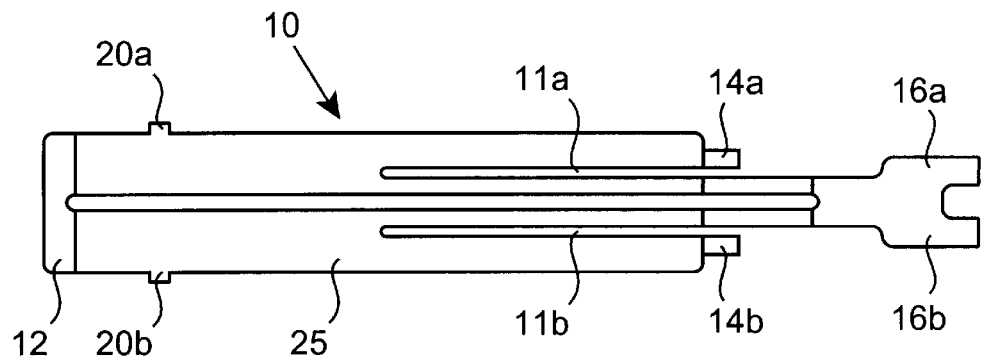
FIG. 1 illustrates a first embodiment of an inventive spring clip from above.
Figure 2:
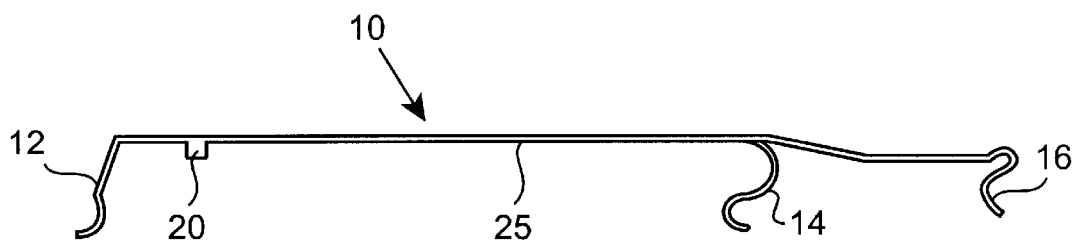
FIG. 2 is a side view of the spring clip shown in FIG. 1.

FIGS. 1 and 2 illustrate a first embodiment of an inventive spring clip 10. The clip 10 includes a main part 25 from which hooked members 12, 14a, 14b, 16a and 16b project out generally at right angles. The hooked members 16a and 16b are arranged resiliently on the main part 25 through the medium of recesses 11a and 11b disposed along said main part. The main part 25 also carries guide tongues 20a and 20b, which function to stabilise the clip laterally.

Figure 3:
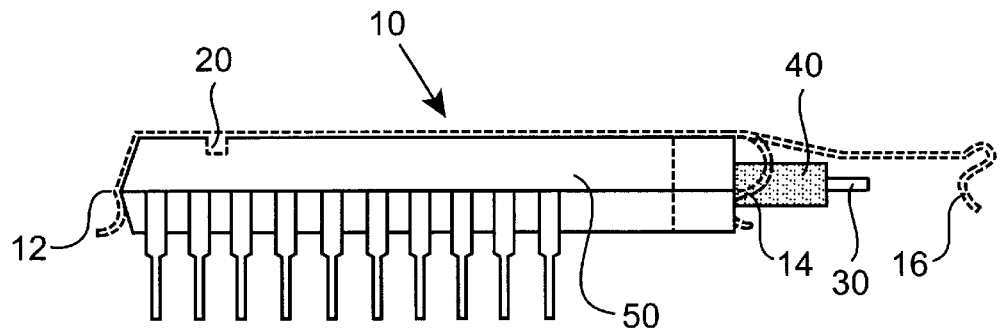
FIG. 3 is a side view which shows the spring clip snapped firmly onto a first optounit.

FIG. 3 shows the spring clip 10 fitted to an optounit 50. In this embodiment, the optounit 50 is a legged capsule. The hooked members 12 and 14 grip firmly around the capsule 50. The hooked member 12 is adapted to grip around one end of the capsule 50. The hooked members 14a and 14b are constructed to grip tightly around the capsule 50 with a spring action when the hooked member 12 has hooked around the end of the capsule 50. The capsule 50 includes an optical connection 40 having an MT-interface 30 for connection to another optounit. In the illustrated embodiment, the hooked members 14a and 14b grip around the capsule 50 on respective sides of the optical connection 40. In the illustrated case, the hooked members 12, 14a and 14b fasten essentially around the outer dimensions of the capsule 50. Alternatively, the hooked members may be fastened around flanges or in recesses provided on and in the capsule 50 respectively.

Figure 4:
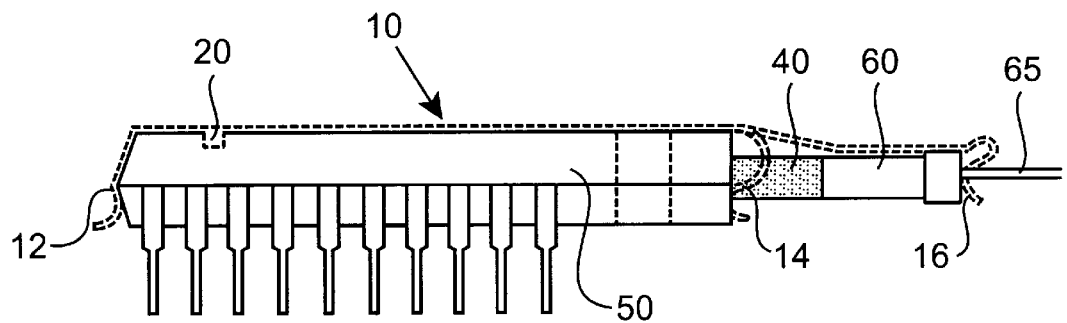
FIG. 4 illustrates the spring clip snapped onto the first optounit and gripping a second optounit connecting with the first optounit.

FIG. 4 shows the spring clip 10 fitted to the capsule 50 and tensioning a second optounit 60 against the optical connection 40 on the capsule 50. In the illustrated case, the second optounit is an optodevice 60 provided on an optical fibre 65 and including an MT-interface adapted to the optical connection 40 on the capsule 50. The hooked members 16a and 16b tighten the optodevice 60 against the optical connection 40. The optodevice 60 can be removed and fitted without needing to remove the spring clip from the capsule 50, by virtue of the hooked members 16a and 16b being resiliently disposed on the main part 25.

Figure 5:
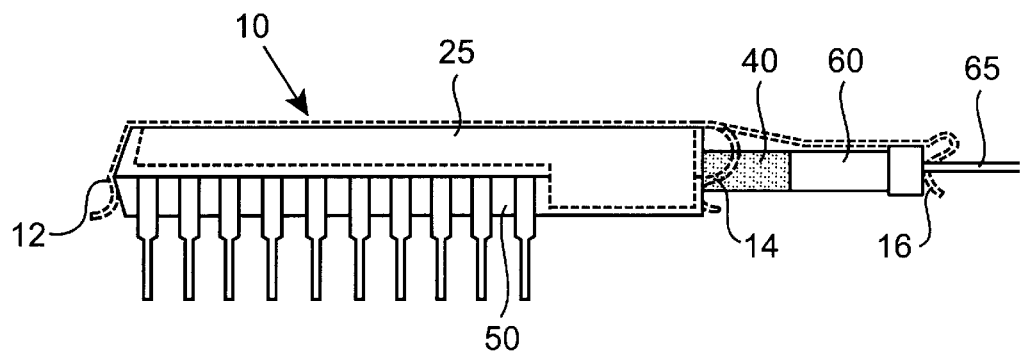
FIG. 5 illustrates an alternative embodiment of the spring clip and shows the clip snapped firmly on the first optounit and gripping said connecting second optounit.

FIG. 5 shows another embodiment of the spring clip 10 with said clip fitted to the capsule 50 and to the second optounit 60. In this embodiment, the spring clip is arranged to cover essentially the whole of the capsule 50 and therewith contribute towards reducing leakage of electromagnetic radiation.

Figure 6:
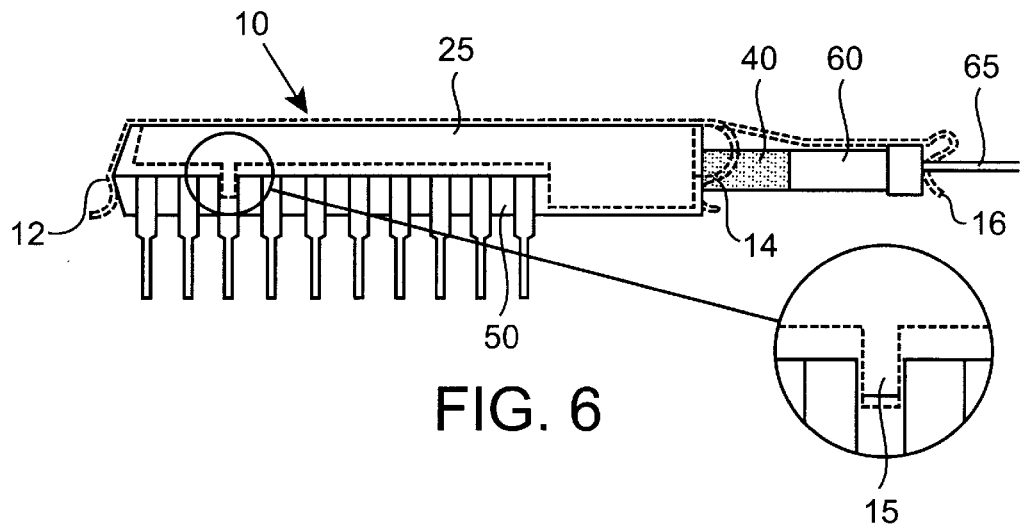
FIG. 6 illustrates a second embodiment of the spring clip firmly snapped onto the first optounit and gripping a connecting second optounit.

FIG. 6 shows that the spring clip 10 can be connected to an appropriate grounding-leg on the capsule 50. The main part 25 may be provided with a connection tongue 15 so as to enable the clip to be connected to ground through the capsule 50.

Figure 7:
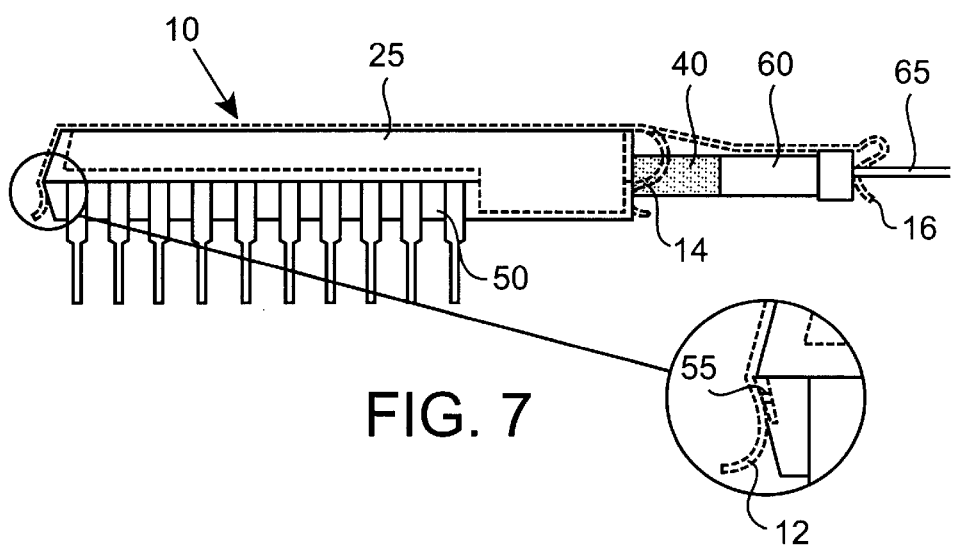
FIG. 7 illustrates a further embodiment of the spring clip and shows the clip firmly snapped onto the first optounit and gripping a connecting second optounit.

FIG. 7 illustrates another way of grounding the spring clip 10. In this case, the capsule 50 has been provided with an additional ground connection 55, this connection 55 being adapted particularly to the hook 12 when said hook is firmly clipped over the capsule 50.

The spring clip is preferably made of a metallic, springy material.

It will be understood that the invention is not restricted to the aforedescribed and illustrated exemplifying embodiment thereof, and that modifications can be made within the scope of the accompanying claims.

What is claimed is:

1. A spring clip for firmly holding together optical units having connection sides provided with guide pins and optical coupling surfaces, wherein said clip includes a main part and hooked members that project out essentially perpendicularly from said main part, and wherein a first and a second hooked member of the spring clip are adapted to be snapped firmly over a first and a second side of a first optical unit, respectively, and a third hooked member of the spring clip is adapted to urge an optical connection side on a second optical unit against an optical connection side on the first optical unit.

2. A spring clip according to claim 1, wherein the first optical unit is a capsule.

3. A spring clip according to claim 1, wherein the second optical unit is an optical contact device.

4. A spring clip according to claim 1, wherein the spring clip is constructed to cover substantially the whole of said first optical unit.

5. A spring clip according to claim 4, wherein said clip includes a ground connection.

6. A spring clip as in claim 1, the first side of the first optical unit is opposite the second side of the first optical unit.

7. A spring clip as in claim 1, wherein the optical connection side on the first optical unit is the first or the second side of the first optical unit.

8. A spring clip for maintaining an optical connection having three hook-shaped tensioning members, wherein a first and a second hook-shaped tensioning member of the spring clip are adapted to grasp a first and a second opposed sides of a first optical unit, respectively, and wherein a third hook-shaped tensioning member of the spring clip is adapted to urge an optical connection with a second optical unit at the first or the second side of the first optical unit.

\* \* \* \* \*